(12) United States Patent
Kim et al.

(10) Patent No.: US 11,059,999 B2
(45) Date of Patent: Jul. 13, 2021

(54) ACRYLIC RUBBER FOAM AND DOUBLE-SIDED ADHESIVE TAPE COMPRISING SAME

(71) Applicant: 3M INNOVATIVE PROPERTIES COMPANY, St. Paul, MN (US)

(72) Inventors: Seongwoo Kim, Gyeonggi-do (KR); Yong Seok Seo, Gyeonggi-do (KR); Do-Kwang Cho, Gyeonggi-do (KR); You Hoon Kim, Woodbury, MN (US); Andrew Satrijo, St. Paul, MN (US); Ross J. DeVolder, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 16/302,825

(22) PCT Filed: May 24, 2017

(86) PCT No.: PCT/US2017/034124
§ 371 (c)(1),
(2) Date: Nov. 19, 2018

(87) PCT Pub. No.: WO2017/205444
PCT Pub. Date: Nov. 30, 2017

(65) Prior Publication Data
US 2019/0292411 A1 Sep. 26, 2019

(30) Foreign Application Priority Data
May 24, 2016 (KR) .................. 10-2016-0063571

(51) Int. Cl.
| | | |
|---|---|---|
| *C08J 7/00* | (2006.01) | |
| *C09J 7/26* | (2018.01) | |
| *C09J 7/25* | (2018.01) | |
| *B32B 5/18* | (2006.01) | |
| *B32B 17/06* | (2006.01) | |
| *B32B 27/06* | (2006.01) | |
| *B32B 27/36* | (2006.01) | |
| *C08J 9/00* | (2006.01) | |
| *C08J 9/32* | (2006.01) | |

(52) U.S. Cl.
CPC .................. *C09J 7/26* (2018.01); *B32B 5/18* (2013.01); *B32B 17/061* (2013.01); *B32B 17/064* (2013.01); *B32B 27/065* (2013.01); *B32B 27/36* (2013.01); *C08J 9/0061* (2013.01); *C08J 9/32* (2013.01); *C09J 7/255* (2018.01); *B32B 2266/0207* (2013.01); *B32B 2405/00* (2013.01); *C08J 2333/08* (2013.01); *C08J 2433/08* (2013.01); *C09J 2301/124* (2020.08); *C09J 2400/243* (2013.01); *C09J 2433/006* (2013.01); *C09J 2467/006* (2013.01)

(58) Field of Classification Search
CPC ......... B32B 5/18; B32B 17/061; B32B 17/32; B32B 27/065; B32B 27/36; C09J 7/26; C09J 7/255; C09J 9/0061; C09J 9/32
See application file for complete search history.

(56) References Cited

U.S. PATENT DOCUMENTS

| | | |
|---|---|---|
| 7,317,043 B2 | 1/2008 | Nakamura |
| 9,376,599 B2 | 6/2016 | Welke |
| 9,938,433 B2 | 4/2018 | Kim |
| 2008/0160242 A1 | 7/2008 | Choi |
| 2010/0104853 A1 | 4/2010 | Yoo |
| 2010/0273935 A1 | 10/2010 | Moritani |
| 2011/0244230 A1 | 10/2011 | Tsubaki |
| 2013/0244013 A1 | 9/2013 | Nakayama |
| 2013/0245191 A1 | 9/2013 | Okada |
| 2013/0245208 A1 | 9/2013 | Okada |
| 2014/0057091 A1 | 2/2014 | Krawinkel |

FOREIGN PATENT DOCUMENTS

| | | |
|---|---|---|
| EP | 1639054 | 1/2005 |
| EP | 2226369 | 9/2010 |
| EP | 2995666 | 3/2016 |
| KR | WO 2009-082158 | 7/2009 |
| KR | 10-1139803 | 4/2012 |
| KR | 10-1266195 | 5/2013 |
| KR | WO 2013-118933 | 8/2013 |
| KR | 10-1464811 | 11/2014 |
| KR | 10-2015-0145140 | 12/2015 |
| KR | 10-1587940 | 1/2016 |
| KR | 10-1884943 | 8/2018 |

OTHER PUBLICATIONS

International Search Report for PCT International Application No. PCT/US2017/034124, dated Jul. 17, 2017, 5 pages.
"Principles, Technology, and Applications of Adhesives," edited by Hongqiang Li, Guangzhou: South China University of Technology Press, Jan. 2014, ISBN 978-7-5623-3872-7, pp. 131.

*Primary Examiner* — Edward J Cain

(57) ABSTRACT

The present invention relates to a double-sided adhesive tape used for applications including the attachment of front glass for mobile devices. A core layer of the double-sided adhesive tape is prepared by adding an acrylic elastomer free of carbon-carbon double bonds while being highly miscible with an acrylic resin to an acrylic monomer(s) and performing curing, and thus can improve the impact resistance of the final double-sided adhesive tape. Also, the core layer may take a form of foam due to the introduced filler such as glass bubbles or organic microspheres, and thus can further contribute to improving the impact resistance of the final double-sided adhesive tape.

14 Claims, 3 Drawing Sheets

ACRYLIC RUBBER FOAM AND DOUBLE-SIDED ADHESIVE TAPE COMPRISING SAME

CROSS REFERENCE TO RELATED APPLICATIONS

This application is a national stage filing under 35 U.S.C. 371 of PCT/US2017/034124, filed May 24, 2017, which claims the benefit of KR Application No. 10-2016-0063571, filed May 24, 2016, the disclosure of which is incorporated by reference in its entirety herein.

FIELD OF THE INVENTION

The present invention relates to a double-sided adhesive tape that can be used for a wide range of applications including the attachment of front glass for mobile devices. More particularly, the present invention relates to acrylic rubber foam and a double-sided adhesive tape that exhibits excellent impact resistance and adhesiveness by including the acrylic rubber foam as a core layer.

DISCUSSION OF RELATED ART

Double-sided adhesive tapes, each of which includes a pressure-sensitive adhesive (PSA) on both sides thereof, are widely used for adhesion between two substrates having low surface adhesiveness.

Such double-sided adhesive tapes are also used for the attachment of touch screen panels (TSPs) in mobile devices, and as the market size of this field grows rapidly in recent years, attempts have been actively made to improve the performance, particularly the impact resistance or drop resistance, of double-sided adhesive tapes. To improve the impact resistance, introducing a rubber material widely used for reducing impact or vibration or a foam layer into a common acrylic double-sided adhesive tape may be contemplated.

In this case, the rubber material introduced into an acrylic double-sided adhesive tape should be homogeneously mixed with an acrylic resin for the preparation of a coating liquid, and should not interfere with or inhibit a photocuring reaction of the acrylic resin. However, most synthetic rubbers, such as styrene-butadiene-styrene (SBS), styrene-ethylene-butadiene-styrene (SEBS), and styrene-isoprene-styrene (SIS), and most natural rubbers are poorly miscible with an acrylic resin. Also, most rubber materials have carbon-carbon double bonds (C=C), which result in interference with a photocuring reaction of an acrylic resin upon UV irradiation, and thus are not easily applicable to the aforementioned process.

CITATION LIST

Patent Literature (Patent Document 1) Korean Laid-open Patent Application No. 2015-0145140 (Dec. 29, 2015)

SUMMARY OF THE INVENTION

Problem to be Solved by the Invention

In order to solve the aforementioned problems, an object of the present invention is to provide acrylic rubber foam that contains an acrylic elastomer for impact resistance and adhesiveness improvement.

Another object of the present invention is to provide a method of preparing the acrylic rubber foam.

Still another object of the present invention is to provide a double-sided adhesive tape that includes the acrylic rubber foam as a core layer.

Yet another object of the present invention is to provide a composite that is bonded using the double-sided adhesive tape.

Means for Solving the Problem

To accomplish the first object, the present invention provides acrylic rubber foam that contains (a) 100 parts by weight of an acrylic resin, (b) 1 to 50 parts by weight of an acrylic elastomer, and (c) 1 to 15 parts by weight of a filler for forming micropores. Here, the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

To accomplish the another object, the present invention provides a method of preparing acrylic rubber foam, the method including: (1) a process of preparing a mixed liquid by mixing 100 parts by weight of an acrylic monomer(s) and 1 to 50 parts by weight of an acrylic elastomer; (2) a process of preparing a liquid composition with a viscosity of 1,000 to 30,000 cps by adding, into the mixed liquid, 0.01 to 1 part by weight of a polymerization initiator, 0.01 to 1 part by weight of a crosslinking agent, and 1 to 15 parts by weight of a filler for forming micropores based on 100 parts by weight of the acrylic monomer(s); and (3) a process of shaping and curing the liquid composition. Here, the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

To accomplish the still another object, the present invention provides a double-sided adhesive tape that includes: a rubber foam layer consisting of the acrylic rubber foam; and two surface adhesive layers disposed on both sides of the rubber foam layer. Also, the present invention provides a double-sided adhesive tape that includes a rubber foam layer consisting of the acrylic rubber foam, two surface adhesive layers disposed on both sides of the rubber foam layer, and a substrate film layer interposed between the rubber foam layer and one of the surface adhesive layers.

To accomplish the yet another object, the present invention provides a composite that includes a first adherend, a second adherend, and the double-sided adhesive tape bonding the adherends together by being interposed between the adherends.

Effect of the Invention

By possessing improved impact resistance, the double-sided adhesive tape according to the present invention can maintain an excellent adhesive strength even in the case of drop impact. Specifically, the double-sided adhesive tape contains a filler for forming micropores and a rubber material free of carbon-carbon double bonds while being highly miscible with an acrylic resin in a core layer thereof, and thus can exhibit improved impact resistance, be easily applicable to processes, and have an improved adhesive strength by not interfering with a photocuring reaction of the acrylic resin. Also, the core layer takes a form of foam due to the introduced filler, and thus can further contribute to improving the impact resistance.

Therefore, the double-sided adhesive tape can exhibit excellent impact resistance and adhesiveness when used in various applications for the adhesion of two substrates with low surface adhesiveness, especially for the adhesion between two substrates in mobile devices, which are susceptible to drop impact.

DETAILED DESCRIPTION OF EXEMPLARY EMBODIMENTS

Figure 1:
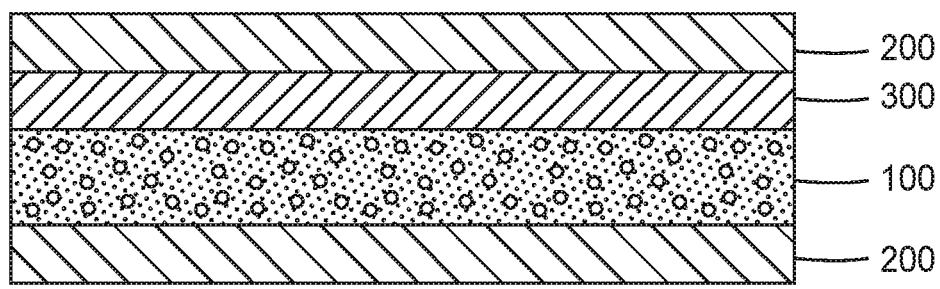
FIG. 1 schematically illustrates one example of a cross-section of a double-sided adhesive tape according to the present invention.

In the following specification, terms in a singular form may refer to one element or may be interchangeably interpreted as referring to at least one element.

Also, the terms "acrylic resin", "acrylic elastomer", "acrylic repeat unit", and "acrylic monomer" used herein may be interpreted as referring to compounds based on acrylic acid, methacrylic acid, or an acrylate and encompassing various polymer resins, elastomers, repeat units, or monomers, all of which include acrylic acid, methacrylic acid, or an acrylate group.

Further, in the present specification, the term "repeat unit derived from compound A" in a polymer resin refers to a unit derived from compound A among constituent repeat units of the polymer chain. For example, compound A, which was used as a monomer for polymerization, forms one of the constituent repeat units of a polymer chain after some bonds or components of a terminal thereof undergo modification due to a reaction such as condensation polymerization, in which case, the polymer thus prepared includes a unit derived from compound A in a main chain or a side chain thereof.

Acrylic Rubber Foam

One aspect of the present invention provides acrylic rubber foam that contains (a) 100 parts by weight of an acrylic resin, (b) 1 to 50 parts by weight of an acrylic elastomer, and (c) 1 to 15 parts by weight of a filler for forming micropores, wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

The acrylic rubber foam includes micropores with a porosity of, for example, 5% to 50% or 15% to 35%.

Besides the micropores, the acrylic rubber foam may further contain a polymerization initiator, a crosslinking agent, and the like.

Hereinafter, ingredients of the acrylic rubber foam will be described in detail.

(a) Acrylic Resin

As a main ingredient of the acrylic rubber foam, the acrylic resin provides adhesive strength and mechanical properties.

The acrylic resin includes one or more acrylic repeat units. That is, the acrylic resin includes a repeat unit(s) derived from one or more acrylic monomers. In other words, the acrylic resin may include a resin into which a single acrylic monomer is polymerized, or a polymer into which two or more types of acrylic monomers are copolymerized.

Specifically, the acrylic resin includes one or more repeat units selected from the group consisting of repeat units derived from a $C_{1-10}$alkyl acrylate, and repeat units derived from a $C_{1-6}$alkoxy$C_{1-6}$alkyl acrylate.

More specifically, the acrylic resin may include one or more repeat units derived from a compound selected from the group consisting of 2-ethylhexyl acrylate, acrylic acid, and 2-hydroxyethyl acrylate.

As an example, the acrylic resin may include a repeat unit derived from 2-ethylhexyl acrylate and a repeat unit derived from acrylic acid. In this case, the acrylic resin may include (a-1) 80 to 99 wt % of the repeat unit derived from 2-ethylhexyl acrylate and (a-2) 1 to 20 wt % of the repeat unit derived from acrylic acid, wherein the wt % is based on the total weight of the acrylic resin.

As another example, the acrylic resin may include a repeat unit derived from 2-ethylhexyl acrylate, a repeat unit derived from acrylic acid, and a repeat unit derived from 2-hydroxyethyl acrylate. In this case, the acrylic resin may include (a-1) 75 to 98 wt % of the repeat unit derived from 2-ethylhexyl acrylate, (a-2) 1 to 10 wt % of the repeat unit derived from acrylic acid, and (a-3) 1 to 20 wt % of the repeat unit derived from 2-hydroxyethyl acrylate, wherein the wt % is based on the total weight of the acrylic resin.

The acrylic rubber foam according to the present invention may contain the acrylic resin at 60 to 95 wt % based on the total weight thereof.

(b) Acrylic Elastomer

The acrylic elastomer provides impact resistance and toughness by being mixed into the acrylic resin.

The acrylic elastomer includes one or more acrylic repeat units in a main chain thereof, and one or more functional groups selected from the group consisting of an epoxide group, a halogen, a carboxyl group, a hydroxyl group, and an amino group in a main chain or a side chain thereof.

For example, the acrylic elastomer may include (b1) one or more repeat units represented by the following Structural Formula 1, and (b2) one or more repeat units represented by the following Structural Formula 2 at a weight ratio (b1:b2) of 85~99:1~15:

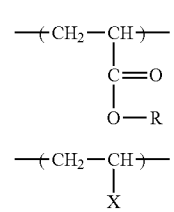

[Structural Formula 1]

[Structural Formula 2]

Where in the above formulae, R is a $C_{1-10}$alkyl or a $C_{1-6}$alkoxy$C_{1-6}$alkyl, and X is an epoxide group, a halogen, a carboxyl group, a hydroxyl group, or an amino group.

In other words, the acrylic elastomer includes (b1) one or more repeat units represented by the Structural Formula 1, and (b2) one or more repeat units represented by the Structural Formula 2, wherein the weight ratio (b1:b2) of the repeat units may be 85~99:1~15, and is preferably 90~99:1~10, or 95~98:2~5.

As an example, the acrylic elastomer may include a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is a carboxyl group.

The acrylic elastomer may include the repeat unit A, the repeat unit B, and the repeat unit C at a molar ratio of 35~55:45~65:1~5. Also, in this case, the acrylic elastomer may include the repeat unit D at 2 to 5 wt % based on the total weight thereof.

The acrylic elastomer may have a number average molecular weight (Mn) in a range of 50,000 to 1,000,000 g/mol, 100,000 to 1,000,000 g/mol, 100,000 to 500,000 g/mol, or 300,000 to 1,000,000 g/mol.

As a preferred example, the acrylic elastomer has an Mn of 50,000 to 1,000,000 g/mol, and includes a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is a carboxyl group.

Also, as a preferred example, the acrylic elastomer includes a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is s carboxyl group, in which case, the acrylic elastomer includes the repeat unit A, the repeat unit B, and the repeat unit C at a molar ratio of 35~55:45~65:1~5, and the repeat unit D at 2 to 5 wt % based on the total weight thereof.

As described, the acrylic elastomer may include an acrylic repeat unit in a main chain thereof, and a curable functional group in a main chain or a side chain thereof. Accordingly, the acrylic elastomer may be highly miscible with an acrylic resin due to a similarity in chemical structure.

Also, the acrylic elastomer may completely be free of carbon-carbon double bonds (C=C). Alternatively, the acrylic elastomer may include a trace amount of carbon-carbon double bonds (C=C), for example, at less than 1 mol %, less than 0.1 mol %, or less than 0.01 mol %. Accordingly, the acrylic elastomer does not interfere with a photocuring reaction of an acrylic resin upon UV irradiation, and thus may be easily applicable to processes.

The acrylic rubber foam according to the present invention may contain the acrylic elastomer at 1 to 50 parts by weight with respect to 100 parts by weight of the acrylic resin, and preferably contains the acrylic elastomer at 5 to 20 parts by weight or 7.5 to 15 parts by weight with respect to 100 parts by weight of the acrylic resin.

(c) Filler for Forming Micropores

The filler forms micropores in an interior of the acrylic rubber foam.

As the filler, a filler that contains gas therein and includes a shell consisting of an inorganic material or organic material may be used. For example, glass bubbles, organic microspheres, or a mixture thereof may be used as the filler, but other fillers may also be used as necessary.

The organic microspheres may be used as an expanded type or unexpanded type. Considering that the process of the present invention does not involve the use of heat, it may be more beneficial if the organic microspheres are of an expanded type.

For example, the acrylic rubber foam according to the present invention may contain the filler ranging from 1 to 15 parts by weight with respect to 100 parts by weight of the acrylic resin, and preferably contains the filler at 1 to 10 parts by weight or 1 to 7 parts by weight with respect to 100 parts by weight of the acrylic resin.

As a preferred example, the acrylic rubber foam contains the acrylic elastomer at 7.5 to 15 parts by weight and the filler at 1 to 7 parts by weight with respect to 100 parts by weight of the acrylic resin, wherein the acrylic resin includes (a-1) a repeat unit derived from 2-ethylhexyl acrylate at 80 to 99 wt %, and (a-2) a repeat unit derived from acrylic acid at 1 to 20 wt % based on the total weight of the acrylic resin, and the filler may be an expanded-type organic microsphere.

(d) Polymerization Initiator

The acrylic rubber foam according to the present invention may also contain a polymerization initiator.

The polymerization initiator may be a photoinitiator, a thermal initiator, or a combination thereof.

A conventional photoinitiator may be used as the photoinitiator. For example, the photoinitiator may be one or more selected from the group consisting of ketones (benzophenone, acetophenone, etc.), benzoins, benzoin ethers, benzyls, and benzyl ketals.

As an example, the photoinitiator may be a benzoin ether (e.g., benzoin methyl ether or benzoin isopropyl ether) or a substituted benzoin ether.

As another example, the photoinitiator may be a substituted acetophenone, for example, 2,2-diethoxyacetophenone or 2,2-dimethoxy-2-phenylacetophenone.

As a still another example, the photoinitiator may be a substituted alpha-ketol (e.g., 2-methyl-2-hydroxypropiophenone), an aromatic sulfonyl chloride (e.g., 2-naphthalene sulfonyl chloride), or a photoactive oxime (e.g., 1-phenyl-1,2-propanedione-2-(O-ethoxycarbonyl)oxime).

As a yet another example, the photoinitiator may be 1-hydroxycyclohexyl phenyl ketone, bis(2,4,6-trimethylbenzoyl)phenylphosphine oxide, 1[4-(2-hydroxyethoxy)phenyl]-2-hydroxy-2-methyl-1-propan-1-one, 2-benzyl-2-dimethylamino-1-(4-morpholinophenyl)butanone, 2-methyl-1-[4-(methylthio)phenyl]-2-morpholinopropan-1-one, 2-hydroxy-2-methyl-1-phenylpropan-1-one, or the like.

As the thermal initiator, a water-soluble thermal initiator or a water-insoluble (i.e., oil-soluble) thermal initiator may be selected depending on the polymerization method used.

As the water-soluble initiator, a persulfate such as potassium persulfate, ammonium persulfate, sodium persulfate, and a mixture thereof a reducing agent such as a metabisulfite (e.g., sodium metabisulfite) or a bisulfate (e.g., sodium bisulfate) and an oxidation-reduction initiator such as a reaction product of a persulfate; 4,4'-azobis(4-cyanopentanoic acid) and a soluble salt thereof (e.g., a sodium salt, a potassium salt), or the like may be used.

As the oil-soluble initiator, an azo such as 2,2'-azobis(2-methylbutanenitrile), 2,2'-azobis(isobutyronitrile), and 2,2'- azobis(2,4-dimethylpentanenitrile); or a peroxide such as benzoyl peroxide, cyclohexane peroxide, and lauroyl peroxide may be used.

The acrylic rubber foam according to the present invention may contain the polymerization initiator at 0.01 to 1 part by weight or 0.05 to 0.5 parts by weight with respect to 100 parts by weight of the acrylic resin.

(e) Crosslinking Agent

The acrylic rubber foam according to the present invention may further contain a crosslinking agent.

The crosslinking agent may be a photocrosslinking agent, a thermal-crosslinking agent, or a combination thereof.

A conventional multifunctional acrylic compound may be used as the photocrosslinking agent. For example, the photocrosslinking agent may be one or more selected from the group consisting of diacrylates and triacrylates. Specific examples of such diacrylates may include 1,4-butanediol diacrylate, 1,6-hexanediol diacrylate (HDDA), 1,9-nonanediol diacrylate, tripropylene glycol diacrylate, tetraethylene glycol diacrylate, trimethylolpropane triacrylate, and pentaerythritol triacrylate.

The thermal-crosslinking agent may be an isocyanate, and is preferably a trimerized isocyanate or an aliphatic isocyanate. As a specific example, the thermal-crosslinking agent may be the aforementioned trimerized isocyanate; a trimerized polyisocyanate; or a polyfunctional isocyanate.

The acrylic rubber foam according to the present invention may contain the crosslinking agent at 0.01 to 1 part by weight, or 0.05 to 0.5 parts by weight with respect to 100 parts by weight of the acrylic resin.

In addition, the acrylic rubber foam may contain one or more various additives as necessary. Specific examples of such additives include tackifiers (e.g., rosin esters, terpenes, phenols, aliphatic synthetic hydrocarbon resins, aromatic synthetic hydrocarbon resins, or a mixture of an aliphatic synthetic hydrocarbon resin(s) and an aromatic synthetic hydrocarbon resin(s)), surfactants, plasticizers (other than physical foaming agents), nucleating agents (e.g., talc, silica, or $TiO_2$), fillers (e.g., inorganic fillers and organic fillers), fibers, aging inhibitors, antioxidants, UV-absorbers, antistatic agents, lubricants, pigments, dyes, reinforcing agents, hydrophobic or hydrophilic silicas, calcium carbonate, toughening agents, flame retardants, finely ground polymeric particles (e.g., polyester, nylon, or polypropylene), stabilizers (e.g., UV stabilizers), and a combination thereof. The additives may be included in an amount sufficient for attaining a desired property of the prepared foam.

Preparation Method of Acrylic Rubber Foam

In another aspect of the present invention, a method of preparing acrylic rubber foam is provided, wherein the method includes: (1) a process of preparing a mixed liquid by mixing 100 parts by weight of an acrylic monomer(s) and 1 to 50 parts by weight of an acrylic elastomer; (2) a process of preparing a liquid composition with a viscosity of 1,000 to 30,000 cps by adding, into the mixed liquid, 0.01 to 1 part by weight of a polymerization initiator, 0.01 to 1 part by weight of a crosslinking agent, and 1 to 15 parts by weight of a filler for forming micropores based on 100 parts by weight of the acrylic monomer(s); and (3) a process of shaping and curing the liquid composition. Here, the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

Hereinafter, the aforementioned processes will be described in detail.

(1) Mixing of Acrylic Monomer and Acrylic Elastomer

In the process (1), a mixed liquid is prepared by mixing 100 parts by weight of an acrylic monomer and 1 to 50 parts by weight of an acrylic elastomer.

As a main ingredient of the acrylic rubber foam, the acrylic monomer provides adhesive strength and mechanical properties when used for preparing a tape or the like through polymerization and curing.

The acrylic monomer includes one or more acrylic compounds. In other words, the "acrylic monomer" may refer to a mixture of one or more acrylic monomers. Specifically, the acrylic monomer(s) is/are one or more selected from the group consisting of $C_{1-10}$alkyl acrylates and $C_{1-6}$alkoxy$C_{1-6}$alkyl acrylates. More specifically, the acrylic monomer(s) may be one or more selected from the group consisting of 2-ethylhexyl acrylate, acrylic acid, and 2-hydroxyethyl acrylate.

As an example, the acrylic monomer(s) may include 2-ethylhexyl acrylate and acrylic acid. In this case, the acrylic monomer(s) may include (a-1) 2-ethylhexyl acrylate at 80 to 99 wt % and (a-2) acrylic acid at 1 to 20 wt % based on the total weight thereof.

As another example, the acrylic monomer(s) may include 2-ethylhexyl acrylate, acrylic acid, and 2-hydroxyethyl acrylate. In this case, the acrylic monomer(s) may include (a-1) 2-ethylhexyl acrylate at 75 to 98 wt %, (a-2) acrylic acid at 1 to 10 wt %, and (a-3) 2-hydroxyethyl acrylate at 1 to 20 wt % based on the total weight thereof.

The acrylic monomer(s) may be used in the amount of 60 to 95 wt % based on the total weight of a solid content of a liquid composition produced in the subsequent step(s) (i.e., composition for preparing acrylic rubber foam).

The acrylic elastomer provides impact resistance and toughness by being mixed with the acrylic monomer.

The acrylic elastomer includes one or more acrylic repeat units in a main chain thereof, and includes one or more functional groups selected from the group consisting of an epoxide group, a halogen, a carboxyl group, a hydroxyl group, and an amino group in a main chain or a side chain thereof. Accordingly, the acrylic elastomer may be highly miscible with the acrylic monomer(s) due to a similarity in chemical structure.

For example, the acrylic elastomer includes (b1) one or more repeat units represented by the Structural Formula 1 and (b2) one or more repeat units represented by the Structural Formula 2, wherein the repeat units may be included in a weight ratio (b1:b2) of 85 to 99:1 to 15, and are preferably included in a weight ratio of 90~99:1~10 or 95~98:2~5.

As an example, the acrylic elastomer may include a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is a carboxyl group.

The acrylic elastomer may include the repeat unit A, repeat unit B, and repeat unit C in a molar ratio of 35~55:45~65:1~5. Also, in this case, the acrylic elastomer may include the repeat unit D in the amount of 2 to 5 wt % based on the total weight thereof.

The acrylic elastomer may have a number average molecular weight (Mn) in a range of 50,000 to 1,000,000 g/mol, 100,000 to 1,000,000 g/mol, 100,000 to 500,000 g/mol, or 300,000 to 1,000,000 g/mol.

As a preferred example, the acrylic elastomer has an Mn of 50,000 to 1,000,000 g/mol, and includes a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is a carboxyl group.

Also, as a preferred example, the acrylic elastomer includes a repeat unit A represented by the Structural Formula 1 where R is an ethyl group, a repeat unit B represented by the Structural Formula 1 where R is a butyl group, a repeat unit C represented by the Structural Formula 1 where R is a methoxyethyl group, and a repeat unit D represented by the Structural Formula 2 where X is a carboxyl group, in which case, the acrylic elastomer includes the repeat unit A, repeat unit B, and repeat unit C in a molar ratio of 35~55:45~65:1~5, and the repeat unit D in the amount of 2 to 5 wt % with respect to the total weight thereof.

Also, the acrylic elastomer may be completely free of carbon-carbon double bonds (C=C). Alternatively, the acrylic elastomer may include a trace amount of carbon-carbon double bonds (C=C), for example, at less than 1 mol %, less than 0.1 mol %, or less than 0.01 mol %. Accordingly, the acrylic elastomer does not interfere with a photocuring reaction of an acrylic resin upon UV irradiation, and thus may be easily applicable to processes.

Also, the acrylic elastomer may have a glass transition temperature (Tg) in a range of −30° C. to −10° C., or −50° C. to 0° C.

In addition, the acrylic elastomer may have a loss modulus/storage modulus ratio (i.e., tan(delta)) of about 2.0 or more, e.g., 2.0 to 3.0, at a temperature of about −20° C. Also, the acrylic elastomer may have a storage modulus of $2 \times 10^9$ dyne/cm$^2$ or more at a temperature less than about −40° C. When the acrylic elastomer has such a rheological behavior, not only does it exhibit a high damping characteristic at room temperature but also the internal cohesive strength thereof is high such that a large amount of energy is required for destroying an internal structure thereof, which may be more advantageous for impact strength reinforcement.

The acrylic elastomer may be included in the mixture at 1 to 50 parts by weight with respect to 100 parts by weight of the acrylic monomer(s), and is preferably included at 5 to 20 parts by weight and more preferably included at 7.5 to 15 parts by weight with respect to 100 parts by weight of the acrylic monomer(s).

The mixing operation in the present process may be carried out using a conventional device such as a mixer, blender, shaker, and the like to result in a homogeneously mixed liquid of the acrylic monomer(s) and acrylic elastomer.

During the mixing operation, (i) the acrylic elastomer may be directly added into the acrylic monomer(s), or (ii) the acrylic elastomer may be added after the acrylic monomer(s) is/are prepared into a prepolymer through the addition of a small amount of a polymerization initiator thereinto. Preferably, it may be more advantageous for preventing a rapid increase in the viscosity of the mixed liquid when the acrylic elastomer is directly added to the acrylic monomer(s).

The viscosity of the mixed liquid obtained during the present process may be about 1,000 to 30,000 cps, and is preferably 3,000 to 19,000 cps or 3,000 to 10,000 cps. When the viscosity is within the above preferred range, it may be more advantageous for maintaining an optimum viscosity required for the shaping of a coating even when the viscosity increases due to subsequent filler addition.

(2) Addition of Filler

In the process (2), a liquid composition is obtained by adding, into the mixed liquid, a polymerization initiator at 0.01 to 1 part by weight, a crosslinking agent at 0.01 to 1 part by weight, and a filler for forming micropores at 1 to 15 parts by weight based on 100 parts by weight of the acrylic monomer(s). According to some embodiments of the present invention, homogeneous liquid syrup may be obtained in this case by adding a polymerization initiator, a crosslinking agent, and a filler into the mixed liquid and carrying out mixing using a conventional device such as a mixer, blender, shaker, and the like.

The polymerization initiator serves to initiate the polymerization of the acrylic monomer(s) upon the application of heat or UV radiation. The polymerization initiator may be a photoinitiator, a thermal initiator, or a combination thereof. For example, a conventional photoinitiator may be used as the polymerization initiator. Specifically, the photoinitiator may be one or more selected from the group consisting of ketones (benzophenone, acetophenone, etc.), benzoins, benzoin ethers, benzyls, and benzyl ketals.

The polymerization initiator may be included at 0.01 to 1 part by weight, and is preferably included at 0.05 to 0.5 parts by weight with respect to 100 parts by weight of the acrylic monomer(s).

The crosslinking agent serves to crosslink chains into which the acrylic monomer(s) is/are polymerized.

As the crosslinking agent, a conventional multifunctional acrylic compound may be used. For example, the crosslinking agent may be one or more selected from the group consisting of diacrylates and triacrylates.

Specific examples of such diacrylates may include 1,4-butanediol diacrylate, 1,6-hexanediol diacrylate (HDDA), 1,9-nonanediol diacrylate, tripropylene glycol diacrylate, tetraethylene glycol diacrylate, trimethylolpropane triacrylate, and pentaerythritol triacrylate.

The crosslinking agent may be included at 0.01 to 1 part by weight, and is preferably included at 0.05 to 0.5 parts by weight with respect to 100 parts by weight of the acrylic monomer(s).

The filler for forming micropores produces micropores in an interior of acrylic rubber foam so that the foam attains excellent impact resistance.

Glass bubbles or organic microspheres may be used as the filler, but other fillers may also be used as necessary.

The organic microspheres may be an expanded type or unexpanded type. Considering that the process of the present invention does not involve the use of heat, it may be more beneficial if the organic microspheres are of an expanded type.

The filler is included at 1 to 15 parts by weight, and is preferably included at 1 to 10 parts by weight or 1 to 7 parts by weight with respect to 100 parts by weight of the acrylic monomer(s).

The liquid composition prepared through the processes (1) and (2) may have a viscosity of 5,000 to 19,000 cps or 7,000 to 19,000 cps. The viscosity of the liquid composition within the above preferred range is appropriate for shaping or coating and is at the same time not too high, thus making the liquid composition highly applicable to processes.

The liquid composition prepared as described, that is, a composition for preparing acrylic rubber foam contains (a) an acrylic monomer(s) at 100 parts by weight, (b) an acrylic elastomer at 1 to 50 parts by weight, (c) a filler for forming micropores at 1 to 15 parts by weight, (d) a polymerization initiator at 0.01 to 1 part by weight, and (e) a crosslinking agent at 0.01 to 1 part by weight. In this case, the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

According to a preferred example, the composition contains the acrylic elastomer at 7.5 to 15 parts by weight and the filler at 1 to 7 parts by weight with respect to 100 parts by weight of the acrylic monomer(s), wherein the acrylic monomer(s) contain(s) (a-1) 2-ethylhexyl acrylate at 80 to 99 wt % and (a-2) acrylic acid at 1 to 20 wt % based on the total weight thereof, and the filler may be an expanded-type organic microsphere.

(3) Shaping and Curing

In the process (3), the liquid composition prepared in the previous process is shaped and cured. In other words, the liquid composition is cured, crosslinked by a crosslinking agent, and finally prepared into acrylic rubber foam during the present process.

According to a preferred example of the present process, the liquid composition may be shaped into a sheet with a predetermined thickness and cured by actinic radiation (e.g., UV radiation) or heat.

Curing by actinic radiation may be carried out, for example, by exposing an object to UV radiation. Various devices and procedures for UV irradiation are well known in the art. For example, UV irradiation and UV curing may be carried out through a conveyor-belt type UV irradiator that uses a low-pressure mercury lamp, medium-pressure mercury lamp, high-pressure mercury lamp, ultra-high-pressure mercury lamp, xenon lamp, metal halide lamp, electrodeless lamp, or the like as a light source.

In this case, the amount of UV radiation may be, for example, 500 to 5,000 $mJ/cm^2$.

As an example, one or two sheets of a support film (e.g., a polyethylene terephthalate film) having a fluorosilicone release liner on a surface thereof may be passed through an inside of an inert chamber, and the liquid composition prepared during the process (2) may be applied uncured on the support film through notched-bar coating, dual-roller coating, die coating, or the like to provide a coating on the support film. In this case, the coating speed may be about 0.5 to 10 m/min or 1 to 5 m/min. During the coating operation, the amount of the applied liquid composition may be adjusted appropriately so that the thickness of the produced final rubber foam sheet is in a range of 50 to 250 μm or 100 to 200 μm.

At least one surface of the liquid composition coating may be exposed to UV radiation either directly or through the release liner.

When preparing a thin foam sheet in thick, one-time UV irradiation on a single surface may be sufficient.

However, when the preparation of a thick foam sheet in thick is contemplated, UV irradiation may be performed on both surfaces or repeated two to ten times to induce sufficient curing.

According to one example, a cured acrylic rubber foam sheet may be obtained by applying the liquid composition between two polyethylene terephthalate support films release-treated with fluorosilicone by using dual rollers, and then subjecting the same to UV irradiation (e.g., once or twice at 0.1 to 5 $mW/cm^2$ for 30 to 100 seconds, and then once or twice at 5 to 15 $mW/cm^2$ for 30 to 100 seconds) while passing the liquid composition and support films through an inside of an inert chamber.

Double-Sided Adhesive Tape

In still another aspect of the present invention, a double-sided adhesive tape including the aforementioned acrylic rubber foam as a core layer is provided.

FIG. 1 schematically illustrates one example of a cross-section of a double-sided adhesive tape according to the present invention. The example will be described in more detail with reference to the accompanying FIG. 1. In the accompanying drawings, size, spacing, or the like may be exaggerated for better understanding, and illustration of details apparent to those skilled in the art may be omitted. Also, in describing configurations, a description such as one layer being formed "on" another layer refers to both of the following: the one layer being formed "directly on" the other layer; or the one layer being formed "indirectly on" the other layer, with another element being interposed between the two layers.

As shown in FIG. 1, the double-sided adhesive tape 10 includes a rubber foam layer 100 consisting of the acrylic rubber foam according to the present invention, and two surface adhesive layers 200 disposed on both sides of the rubber foam layer 100.

Also, the double-sided adhesive tape 10 may further include a substrate film layer 300 interposed between the rubber foam layer 100 and one of the surface adhesive layers 200.

A method of preparing the double-sided adhesive tape may include, for example, preparing a laminated sheet by heat-laminating a black polyethylene terephthalate film including a primer coating on both sides thereof onto an acrylic rubber foam sheet, and then heat-laminating a surface adhesive layer onto each of both sides of the laminated sheet.

Hereinafter, each of constituent layers of the double-sided adhesive tape will be described in more detail.

Rubber Foam Layer

The rubber foam layer 100 is disposed in the double-sided adhesive tape as a core layer, and, by including the acrylic rubber foam according to the present invention therein, serves to provide impact resistance.

The rubber foam layer may have a thickness in a range of 50 to 250 μm or 100 to 200 μm.

Surface Adhesive Layer

The surface adhesive layers 200 are disposed as two outer layers of the double-sided adhesive tape, and provide adhesive strength to both sides of the double-sided adhesive tape.

Each of the two surface adhesive layers may have a thickness in a range of 30 to 150 μm or 30 to 90 μm.

For example, the rubber foam layer 100 may have a thickness of 50 to 250 μm, and each of the two surface adhesive layers 200 may have a thickness of 30 to 150 μm.

The surface adhesive layer may contain a conventional pressure-sensitive adhesive (PSA), for example, a solvent-based acrylic adhesive (or bonding agent) or a UV-curable acrylic adhesive (or bonding agent).

For example, the surface adhesive layer may contain an acrylic pressure-sensitive adhesive, a rubber pressure-sensitive adhesive, a vinyl alkyl ether pressure-sensitive adhesive, a silicone pressure-sensitive adhesive, a polyester pressure-sensitive adhesive, a polyamide pressure-sensitive adhesive, a urethane pressure-sensitive adhesive, a fluorinated pressure-sensitive adhesive, an epoxy pressure-sensitive adhesive, or another known pressure-sensitive adhesive, but is not limited to those listed above. Each of the above pressure-sensitive adhesives may be used alone or in combination.

The surface adhesive layer may contain one or more suitable additives depending on the intended use. Examples of useful additives in the present invention include tackifiers (e.g., rosin esters, terpenes, phenols, aliphatic synthetic hydrocarbon resins, aromatic synthetic hydrocarbon resins, or a mixture of an aliphatic synthetic hydrocarbon resin(s) and an aromatic synthetic hydrocarbon resin(s)), crosslinking agents (e.g., polyisocyanate compounds, silicone compounds, epoxy compounds, and alkyl-etherified melamine compounds), surfactants, plasticizers (other than physical foaming agents), nucleating agents (e.g., talc, silica, or $TiO_2$), fillers (e.g., inorganic fillers and organic fillers), fibers, aging inhibitors, antioxidants, UV-absorbers, antistatic agents, lubricants, pigments, dyes, reinforcing agents, hydrophobic or hydrophilic silicas, calcium carbonate, toughening agents, flame retardants, finely ground polymeric particles (e.g., polyester, nylon, or polypropylene), stabilizers (e.g., UV stabilizers), colorants (e.g., dyes and pigments such as carbon black), and a combination thereof. Such additives may be appropriately selected depending on a type of the pressure-sensitive adhesive.

Each of the acrylic pressure-sensitive adhesives may be a pressure-sensitive adhesive that contains an acrylic polymer as a base polymer (i.e., base resin). The acrylic polymer may be prepared through the polymerization of one or more alkyl (meth)acrylates as an essential monomer component(s) (i.e. main monomer component(s)), or, if necessary, through the copolymerization of the one or more alkyl (meth)acrylates with one or more monomers copolymerizable with the alkyl (meth)acrylate(s), but is not particularly limited thereto. Examples of the copolymerizable monomers include polar group-containing monomers and polyfunctional monomers. The polymerization may be carried out by any technique known or conventional in the art, such as UV polymerization, solution polymerization, or emulsion polymerization, without being limited to a particular technique.

Each of the alkyl (meth)acrylates is an alkyl (meth) acrylate with a linear or branched alkyl group, in which case, examples thereof include alkyl (meth)acrylates that have 1 to 20 carbon atoms in an alkyl moiety thereof, such as methyl (meth)acrylate, ethyl (meth)acrylate, propyl (meth) acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth) acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among those listed above, alkyl (meth) acrylates having 2 to 14 carbon atoms in an alkyl moiety thereof are preferable, and alkyl (meth)acrylate having two to ten carbon atoms in an alkyl moiety thereof are more preferable.

The amount of the alkyl (meth)acrylate may be, for example, 60 wt % or more or 80 wt % or more with respect to the total weight of constituent monomer components of the acrylic polymer. The acrylic polymer may further contain one or more copolymerizable monomers such as polar group-containing monomers and polyfunctional monomers as a monomer component. As a monomer component, such a copolymerizable monomer may help the pressure-sensitive adhesive to have improved adhesive strength to an adherend or enhanced cohesive strength. Each of the different copolymerizable monomers may be used alone or in combination.

Examples of polar group-containing monomers include carboxyl-containing monomers (e.g., (meth)acrylic acid, itaconic acid, maleic acid, fumaric acid, crotonic acid, and isocrotonic acid) as well as anhydrides thereof (e.g., maleic anhydride); hydroxyl-containing monomers, for example, hydroxyalkyl (meth)acrylates (e.g., hydroxyethyl (meth) acrylate, hydroxypropyl (meth)acrylate, and hydroxybutyl (meth)acrylate); amido-containing monomers (e.g., acrylamide, methacrylamide, N,N-dimethyl (meth)acrylamide, N-methylol (meth)acrylamide, N-methoxymethyl (meth) acrylamide, and N-butoxymethyl (meth)acrylamide); amino-containing monomers (e.g., aminoethyl (meth)acrylate, dimethylaminoethyl (meth)acrylate, and t-butylaminoethyl (meth)acrylate); glycidyl-containing monomers (e.g., glycidyl (meth)acrylate and methylglycidyl (meth)acrylate; cyano-containing monomers (e.g., acrylonitrile and methacrylonitrile); heterocycle-containing vinyl monomers (e.g., N-vinyl-2-pyrrolidone, (meth)acryloylmorpholine, N-vinylpyridine, N-vinylpiperidone, N-vinylpyrimidine, N-vinylpiperazine, N-vinylpyrrole, N-vinylimidazole, and N-vinyloxazole); alkoxyalkyl (meth)acrylate monomers (e.g., methoxyethyl (meth)acrylate and ethoxyethyl (meth)acrylate); sulfonate-containing monomers (e.g., sodium vinyl sulfonate); phosphate-containing monomers (e.g., 2-hydroxyethylacryloyl phosphate); imide-containing monomers (e.g., cyclohexylmaleimide and isopropylmaleimide); and isocyanate-containing monomers (e.g., 2-methacryloyloxyethyl isocyanate). Among those listed above, polar group-containing monomers, acrylic acid, and other carboxyl-containing monomers, and anhydrides thereof are preferable. The amount of the polar group-containing monomers may be typically 30 wt % or less (e.g., 0.1 to 30 wt %), and preferably 0.1 to 15 wt % based on the total amount of constituent monomer components of the acrylic polymer. When the polar group-containing monomers are included in an amount greater than 30 wt %, the acrylic pressure-sensitive adhesive may have excessively high cohesive strength, resulting in insufficient adhesiveness. Also, when included in an excessively small amount, the polar group-containing monomers may not satisfactorily help the acrylic pressure-sensitive adhesive to have sufficient cohesive strength and high shear strength.

Examples of the polyfunctional monomers include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth) acrylate, dipentaerythritol hexa(meth)acrylate, trimethylolpropane tri(meth)acrylate, tetramethylolmethane tri(meth) acrylate, allyl (meth)acrylate, vinyl (meth)acrylate, divinylbenzene, epoxy acrylate, polyester acrylate, and urethane acrylate. The amount of the polyfunctional monomers is typically 2 wt % or less (e.g., 0.01 to 2 wt %), and preferably 0.02 to 1 wt % based on the total amount of constituent monomer components of the acrylic polymer. When the polyfunctional monomers are included in an amount greater than 2 wt % of the total amount of the constituent monomer components of the acrylic polymer, the acrylic pressure-sensitive adhesive may have excessively high cohesive strength, resulting in insufficient adhesiveness. Also, when included in an excessively small amount, the polyfunctional monomer may not satisfactorily help the acrylic pressure-sensitive adhesive to have sufficient cohesive strength.

In addition to the polar group-containing monomers and the polyfunctional monomers, examples of the copolymerizable monomers may also include vinyl esters (e.g., vinyl acetate and vinyl propionate); aromatic vinyl compounds (e.g., styrene and vinyl toluene); olefins or dienes (e.g., ethylene, butadiene, isoprene, and isobutylene); vinyl ethers (e.g., a vinyl alkyl ether); and vinyl chloride. Examples of the copolymerizable monomers may further include (meth) acrylates with an alicyclic hydrocarbon group (e.g., cyclopentyl (meth)acrylate, cyclohexyl (meth)acrylate, and isobornyl (meth)acrylate).

A pressure-sensitive adhesive composition for forming the surface adhesive layers may be prepared by mixing a base polymer, an additive(s), and other ingredients according to a technique known in the art, and such an additive(s) and other ingredients may be included depending on the intended use.

Substrate Film Layer

The substrate film layer 300 is laminated on one side of the rubber foam layer 100 to be interposed between the rubber foam layer 100 and one of the surface adhesive layers 200, and provides processability such as a die-cutting ability.

The substrate film layer may contain one or more resins selected from the group consisting of polyester resins, polyurethane resins, and polyolefin (e.g. polyethylene) resins. Alternatively, the substrate film layer may be configured of paper, a plastic film, cloth, or metal foil.

In some embodiments, examples of suitable materials for the substrate film layer may include paper such as textured paper (e.g., crepe paper) as well as flat (or smooth) paper, natural or synthetic polymer films, nonwoven fabric prepared using natural fibers and/or synthetic fibers and a combination thereof, fiber-reinforced polymer films, fiber- or yarn-reinforced polymer films or nonwoven fabric, and multi-layer laminated structures.

Also, the substrate film layer may have a thickness in a range of 5 to 100 μm or 10 to 100 μm. As an example, the substrate film layer may contain polyethylene terephthalate and have a thickness of 10 to 100 μm.

As another example, the substrate film layer may contain polyethylene terephthalate, have a thickness of 10 to 100 μm, and include a primer layer with a thickness of 1 to 5 μm on one or both sides thereof for the improvement of interfacial adhesive strength with the rubber foam layer and the surface adhesive layer.

As still another example, the substrate film layer may contain polyethylene terephthalate, may be colored black, have a thickness of 10 to 100 μm, and include a primer layer with a thickness of 1 to 5 μm on one or both sides thereof for the improvement of interfacial adhesive strength with the rubber foam layer and the surface adhesive layer.

In addition, the double-sided adhesive tape according to the present invention may further include a release liner(s), an additional adhesive layer(s), a primer layer(s), a filament layer(s), a print layer(s), or the like.

Composite

In yet another aspect of the present invention, a composite bonded using the double-sided adhesive tape is provided. That is, the composite includes a first adherend, a second adherend, and the double-sided adhesive tape that bonds the adherends together by being interposed between the adherends.

In this case, the first adherend may be a glass substrate, and the second adherend may be a plastic substrate. Alternatively, the first adherend may be a glass substrate, and the second adherend may be a metal substrate.

For example, the composite may be a mobile device that includes front glass and a plastic or metallic body.

Hereinafter, the present invention will be described in more detail with reference to examples. However, the following examples are for an illustrative purpose only, and not to limit the scope of the present invention.

In the following examples, the following materials and equipment were used:

(1) Acrylic monomers:
2-Ethylhexyl acrylate (2EHA): Tg=−70° C., LG Chem Ltd.
Acrylic acid (AA): Tg=106° C., LG Chem Ltd.
2-Hydroxyethyl acrylate (2HEA): Tg=−30° C., Osaka Organic Chemical Industry Ltd.

(2) Photoinitiator: IRG 651, Ciba Specialty Chemicals (Currently, BASF Performance Products Ltd.)

(3) Crosslinking agent: Hexanediol diacrylate (HDDA), Osaka Organic Chemical Industry Ltd.

(4) Rheology modifier: Fumed silica, R972, Evonik Industries (5) Pigments: Black pigment solution, black UV/EB paste 9B117 (Penn Color, Inc.)/2EHA (LG Chem Ltd.)/AA=25:69:6 (w/w), IRG 651(Ciba Specialty Chemicals) 0.6 phr.

(6) Fillers: See Table 1 below
i) Glass bubbles: K15, 3M Company
ii) Organic microspheres
Expanded type: MFL-SEVEN and MFL-100MCA, SDI
Unexpanded type: Expancel® 920DET, Akzo Nobel N.V.

TABLE 1

| | Particle size (μm) | Density (g/cc) | Relative density |
|---|---|---|---|
| K15 | 60 | 0.15 | 6 |
| 920DET | 40 | 0.025 | 1 |
| MFL-100MCA | 60 | 0.12 | 4.8 |
| MFL-SEVEN | 30 | 0.14 | 5.6 |

(7) Substrate film: 25 μm-thick, black polyethylene terephthalate (PET) film primer-treated on both sides, Suin Industry, Co., Ltd.

(8) Surface adhesives:
i) Solvent-based acrylic adhesive (F1, Cosmotech Co., Ltd.)
ii) UV-curable acrylic adhesive (DM, designed morphology adhesive, 3M Company (US))

(9) Viscometer: LVT Brookfield viscometer, spindle #64, 12 rpm

Preparation Example 1: Acrylic Elastomer

An acrylic elastomer prepared by copolymerizing ethyl acrylate, butyl acrylate, and 2-methoxyethylacrylate and acrylic acid and having a number average molecular weight (Mn) of about 350,000 mol/g was prepared. In the acrylic elastomer, the molar ratio of ethyl acrylate, butyl acrylate, and 2-methoxyethylacrylate is 44:54:2, and a content of acrylic acid is 2 wt %.

Test Example 1: Evaluation of Acrylic Elastomer (1) Miscibility with Acrylic Monomer(s)

The acrylic elastomer prepared according to Preparation Example 1 was evaluated for miscibility with an acrylic monomer(s). Specifically, 15 parts by weight of an acrylic elastomer was added into 100 parts by weight of a mixture of acrylic monomers in which 2EHA and AA mixed in a weight ratio of 96:4, and the substances were stirred for six days using a shaker mixer (i.e., parallel moving shaker). Subsequently, the appearance of the stirred solution was evaluated, results of which are shown in the following Table 2. Also, a viscosity of the solution was measured with a viscometer, results of which are shown in the following Table 2.

In addition, for comparison, various grades of acrylic elastomers (AR74, AR14, AR212XP, AR212HR) commercially available from ZEON Chemicals L.P. (U.S.) or ZEON Corporation (Japan) were also used for testing.

TABLE 2

| | Composition (parts by weight) | | Elastomer | Appearance of solution | | Viscosity |
|---|---|---|---|---|---|---|
| Number | 2EHA | AA | Elastomer type | Day 3 | Day 6 | (cps) |
| 1 | 96 | 4 | 15 | AR74 | Gel | Gel | 12,000 |
| 2 | 96 | 4 | 15 | AR14(U.S.) | Gel | Gel | 30,000 |
| 3 | 96 | 4 | 15 | AR212XP | Gel-like | Gel-like | 7,900 |
| 4 | 96 | 4 | 15 | AR212HR | Slightly opaque | Slightly opaque | 3,700 |
| 5 | 96 | 4 | 15 | AR14(Japan) | Opaque | Gel | 15,000 |
| 6 | 96 | 4 | 15 | Preparation Example 1 | Transparent | Transparent | 7,200 |

As shown in Table 2 above, the acrylic elastomer prepared according to Preparation Example 1 exhibited the highest miscibility with the acrylic monomers.

(2) Rheological Behaviors

Figure 2A:
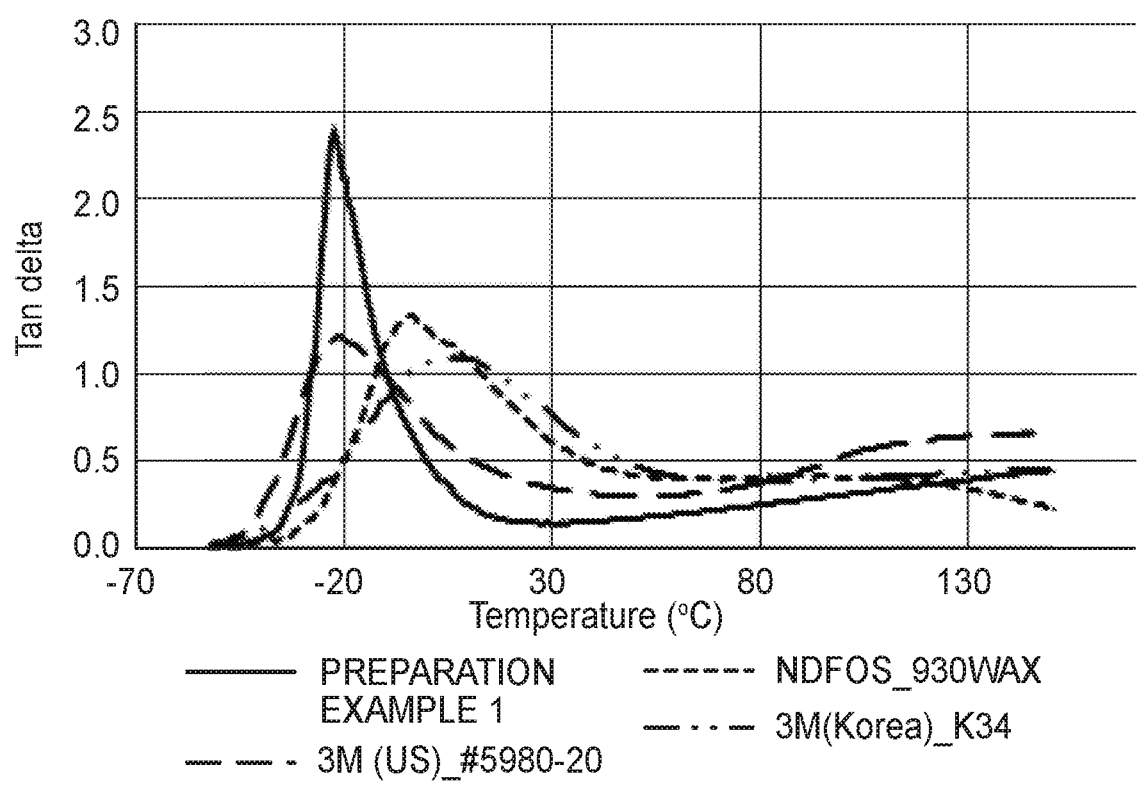
FIGS. 2A and 2B show a rheological behavior of an acrylic elastomer according to Preparation Example 1.
Figure 2B:
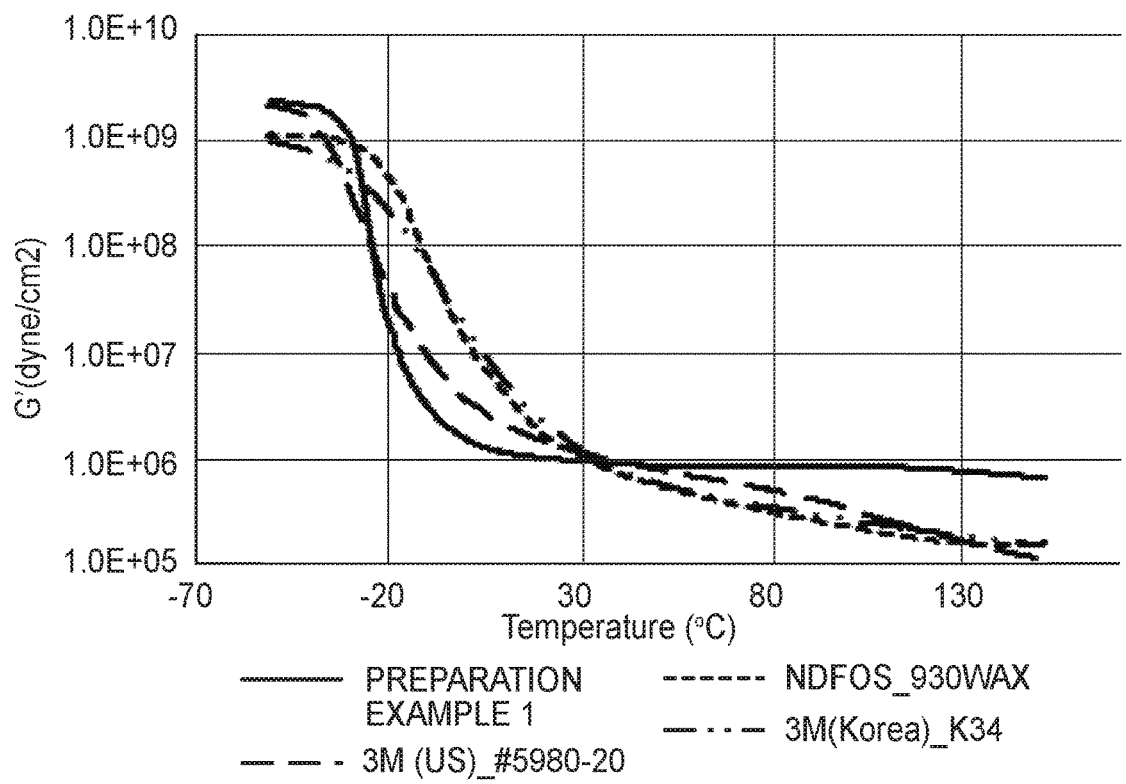

Rheological behaviors of acrylic elastomers were observed (at a frequency of 10 rad/s), results of which are shown in FIGS. 2A and 2B. Also, for comparison, the following commercially available products known to have high impact resistance were also tested, results of which are shown in FIGS. 2A and 2B.

1) #5980-20, 3M Company (U.S.)
2) 930WAX, acrylic foam tape, NDFOS Co., Ltd.
3) K34, pure acrylic foam tape, 3M Company (Korea)

As shown in FIG. 2A, the acrylic elastomer prepared according to Preparation Example 1 had a glass transition temperature (Tg) of about −20° C., and a maximum peak value of a loss modulus/storage modulus ratio (i.e., tan (delta)) as great as about 2.5, which was significantly higher compared to other comparison products. Such a high maximum peak of a loss modulus/storage modulus ratio signifies that the acrylic elastomer can exhibit a high damping characteristic at room temperature. Also, as FIG. 2B illustrates, the acrylic elastomer according to Preparation Example 1 had a higher storage modulus (G') in a low-temperature region (less than −40° C.) as compared to other comparison products, which signifies that the acrylic elastomer according to Preparation Example 1 exhibits a high internal cohesive strength against an external impact at room temperature. Therefore, it can be seen that such a high loss modulus/storage modulus ratio and a high storage modulus at low temperatures make the acrylic elastomer according to Preparation Example 1 advantageous for impact strength reinforcement.

(3) Change in Viscosity

Viscosity increase according to a content of an acrylic elastomer was measured by two addition methods.

As the first addition method, 0, 15 and 20 parts by weight of the acrylic elastomer were added to 100 parts by weight of acrylic monomers (2EHA and AA mixed at a 96:4 weight ratio), respectively, and a viscosity of each mixture was determined.

Also, as the second addition method, a prepolymer was prepared by adding 0.04 parts by weight of IRG651 into 100 parts by weight of acrylic monomers (2EHA and AA mixed at a 96:4 weight ratio), uniformly mixing the substances, and conducting polymerization by UV irradiation until the temperature was raised by 2° C. Subsequently, 15, 20 and 30 parts by weight of the acrylic elastomer were added to 100 parts by weight of the prepolymer, respectively, and a viscosity of each mixture was measured.

Figure 3:
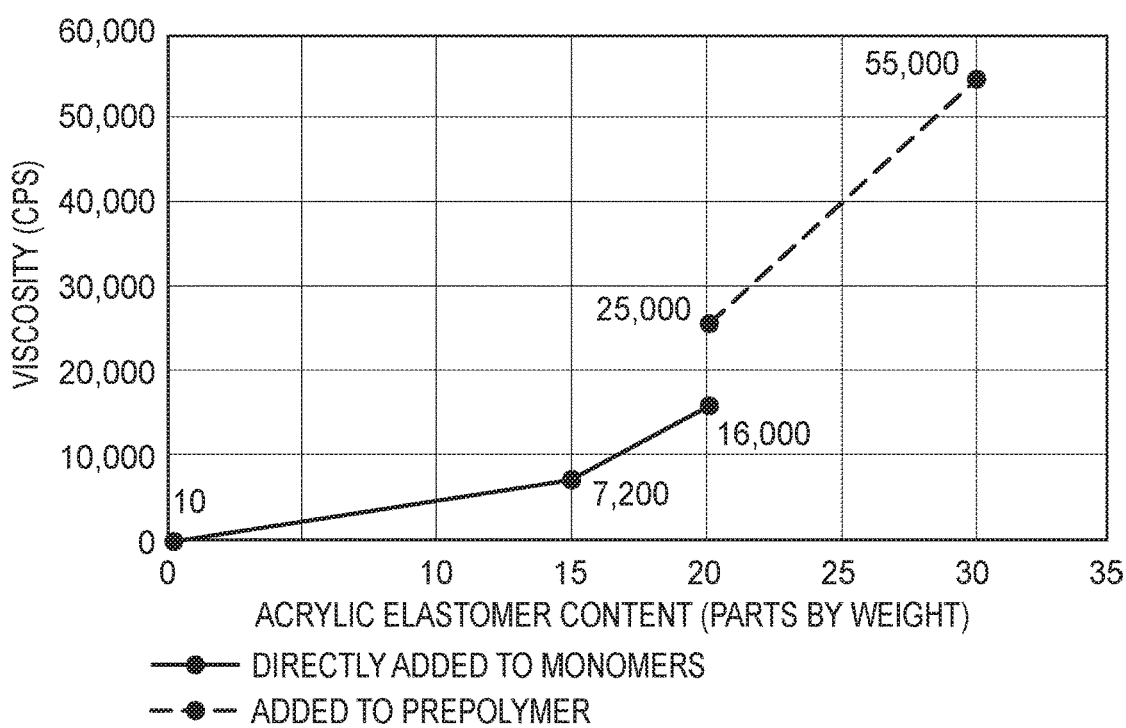
FIG. 3 shows a change in viscosity of a mixed liquid of an acrylic monomer(s) and the acrylic elastomer according to Preparation Example 1 as a function of a content of the acrylic elastomer.

FIG. 3 shows the viscosity of solutions measured with a viscometer.

As shown in FIG. 3, viscosity increased with an increase in a content of the acrylic elastomer. In particular, the addition of the acrylic elastomer into the prepolymer prepared from acrylic monomers led to a significant increase in viscosity, and thus is not preferable.

Therefore, it is preferable to directly add 5 to 20 parts by weight of the acrylic elastomer to 100 parts by weight of the acrylic monomers in view of the process, resulting in a viscosity of 20,000 cps or less. In particular, since the subsequent addition of a filler leads to a further increase in viscosity, it is preferable to add 15 parts by weight or less of the acrylic elastomer to 100 parts by weight of the acrylic monomers in terms of preventing a rapid increase in viscosity in the future.

Preparation ExampleS 2 to 6

Preparation of Liquid Composition (without Addition of Acrylic Elastomer)

A prepolymer was prepared by adding 0.04 parts by weight of a photoinitiator into 100 parts by weight of acrylic monomers (2EHA and AA mixed at a 92:8 weight ratio), and conducting polymerization until the temperature was raised by 6° C. The viscosity of the prepolymer thus prepared was measured to be 450 cps. A photoinitiator, a crosslinking agent, a rheology modifier, a filler, and a pigment were added into the prepolymer in amounts listed in the following Table 3, and the substances were stirred for two hours to prepare respective homogeneous liquid compositions. The viscosity of each liquid composition thus prepared was measured with a viscometer, results of which are shown in the following Table 3.

TABLE 3

| Example | Ingredients of liquid composition (parts by weight) | | | | | | | | Viscosity(cps) | |
|---|---|---|---|---|---|---|---|---|---|---|
| | 2EHA | AA | Photoinitiator | Crosslinking agent | Rheology modifier | Pigment | Filler | Filler type | Before filler addition | Final composition |
| Preparation Example 2 | 92 | 8 | 0.1 | 0.12 | 1.5 | 1.18 | 6 | K15 | 450 | 5,800 |
| Preparation Example 3 | 92 | 8 | 0.1 | 0.12 | — | 1.18 | 5 | MFL-SEVEN | 450 | 2,760 |
| Preparation Example 4 | 92 | 8 | 0.1 | 0.12 | — | 1.18 | 5 | MFL-100MCA | 450 | 2,800 |
| Preparation Example 5 | 92 | 8 | 0.1 | 0.12 | — | 1.18 | 0.2 | 920DET | 450 | 1,300 |
| Preparation Example 6 | 92 | 8 | 0.1 | 0.12 | — | 1.18 | 1 | 920DET | 450 | Gelated |

Preparation Example 7: Preparation of Liquid Composition (without Addition of Filler)

A translucent mixed liquid was prepared by adding 15 parts by weight of the acrylic elastomer according to Preparation Example 1 to 100 parts by weight of acrylic monomers (2EHA and AA mixed at a 92:8 weight ratio), and performing stirring for 15 hours using a disk-type high-shear mixer. Then, 0.1 parts by weight of a photoinitiator, 0.12 parts by weight of a crosslinking agent, and 1.18 parts by weight of a pigment were added into the mixed liquid to prepare a liquid composition, wherein a content of each ingredient is based on 100 parts by weight of the acrylic monomers. The viscosity of the liquid composition thus prepared was measured to be 5,420 cps.

Preparation Examples 8 to 12: Preparation of Liquid Composition

A translucent mixed liquid was prepared by adding 15 parts by weight of the acrylic elastomer according to Preparation Example 1 to 100 parts by weight of acrylic monomers (2EHA and AA mixed at a 92:8 weight ratio), and performing stirring for 15 hours using a disk-type high-shear mixer. The viscosity of the mixed liquid thus prepared was measured to be 5,420 cps. Then, 0.1 parts by weight of a photoinitiator, 0.12 parts by weight of a crosslinking agent, and 1.18 parts by weight of a pigment were added into the mixed liquid, wherein a content of each ingredient is based on 100 parts by weight of the acrylic monomers. Subsequently, a filler was added into the mixed liquid in a type and an amount listed in the following Table 4 to prepare respective liquid compositions.

TABLE 4

| Example | Ingredients of liquid composition (parts by weight) | | | | | | | | Viscosity(cps) | |
|---|---|---|---|---|---|---|---|---|---|---|
| | 2EHA | AA | Elastomer | Photoinitiator | Crosslinking agent | Pigment | Filler | Filler type | Before filler addition | Final composition |
| Preparation Example 8 | 92 | 8 | 15 | 0.1 | 0.12 | 1.18 | 3 | MFL-SEVEN | 5,420 | 10,500 |
| Preparation Example 9 | 92 | 8 | 15 | 0.1 | 0.12 | 1.18 | 5 | MFL-SEVEN | 5,420 | 13,800 |
| Preparation Example 10 | 92 | 8 | 15 | 0.1 | 0.12 | 1.18 | 7 | MFL-SEVEN | 5,420 | 18,200 |
| Preparation Example 11 | 92 | 8 | 15 | 0.1 | 0.12 | 1.18 | 3 | MFL-100MCA | 5,420 | 9,450 |
| Preparation Example 12 | 92 | 8 | 15 | 0.1 | 0.12 | 1.18 | 5 | MFL-100MCA | 5,420 | 15,500 |

Preparation Examples 13 to 17: Preparation of Liquid Composition

Liquid compositions were prepared in the same manner as in Preparation Example 8, except that a mixture of 2EHA and AA (96:4, w/w) was used as acrylic monomers, and a filler was included in each respective liquid composition in a type and an amount listed in the following Table 5. Viscosity was measured twice, once for the mixed liquid before filler addition and once for the final liquid composition, results of which are shown in the following Table 5.

TABLE 5

| Example | Ingredients of liquid composition (parts by weight) | | | | | | | | Viscosity(cps) | |
| --- | --- | --- | --- | --- | --- | --- | --- | --- | --- | --- |
| | 2EHA | AA | Elastomer | Photoinitiator | Crosslinking agent | Pigment | Filler | Filler type | Before filler addition | Final composition |
| Preparation Example 13 | 96 | 4 | 15 | 0.1 | 0.12 | 1.18 | 3 | MFL-SEVEN | 5,200 | 8,750 |
| Preparation Example 14 | 96 | 4 | 15 | 0.1 | 0.12 | 1.18 | 5 | MFL-SEVEN | 5,200 | 13,500 |
| Preparation Example 15 | 96 | 4 | 15 | 0.1 | 0.12 | 1.18 | 7 | MFL-SEVEN | 5,200 | 17,000 |
| Preparation Example 16 | 96 | 4 | 15 | 0.1 | 0.12 | 1.18 | 3 | MFL-100MCA | 5,200 | 9,800 |
| Preparation Example 17 | 96 | 4 | 15 | 0.1 | 0.12 | 1.18 | 5 | MFL-100MCA | 5,200 | 10,250 |

Preparation Example 18: Preparation of Liquid Composition

A liquid composition was prepared in the same manner as in Preparation Example 8, except that 5 parts by weight of each of glass bubbles (K15) and organic microspheres (MFL-SEVEN), as fillers, were added into 100 parts by weight of the acrylic monomers.

Preparation Examples 19 to 21: Preparation of Liquid Composition

Liquid compositions were prepared in the same manner as in Preparation Example 8, except that the acrylic elastomer in an amount listed in the following Table 6 and organic microspheres (MFL-SEVEN) as a filler at 5 parts by weight with respect to 100 parts by weight of the acrylic monomers were included in each respective liquid composition. Viscosity was measured for mixed liquids before filler addition and for final liquid compositions, results of which are shown in the following Table 6.

Preparation Example 22: Preparation of Liquid Composition

A liquid composition was prepared in the same manner as in Preparation Example 8, except that a mixture of 2EHA and AA (94:6, w/w) was used as acrylic monomers, and organic microspheres (MFL-SEVEN) at 5 parts by weight with respect to 100 parts by weight of the acrylic monomers were included as a filler in the liquid composition.

Preparation Examples 23 to 26: Preparation of Liquid Composition

Liquid compositions were prepared in the same manner as in Preparation Example 8, except that a mixture of 2EHA and AA (96:4, w/w) was used as acrylic monomers, and a crosslinking agent in an amount listed in Table 7 and organic microspheres (MFL-SEVEN) as a filler at 5 parts by weight with respect to 100 parts by weight of the acrylic monomers were included in each respective liquid composition.

TABLE 6

| Example | Ingredients of liquid composition (parts by weight) | | | | | | | | Viscosity(cps) | |
| --- | --- | --- | --- | --- | --- | --- | --- | --- | --- | --- |
| | 2EHA | AA | Elastomer | Photoinitiator | Crosslinking agent | Pigment | Filler | Filler type | Before filler addition | Final composition |
| Preparation Example 19 | 92 | 8 | 7.5 | 0.1 | 0.12 | 1.18 | 5 | MFL-SEVEN | 5,200 | 8,750 |
| Preparation Example 20 | 92 | 8 | 10 | 0.1 | 0.12 | 1.18 | 5 | MFL-SEVEN | 5,200 | 13,500 |
| Preparation Example 21 | 92 | 8 | 12.5 | 0.1 | 0.12 | 1.18 | 5 | MFL-SEVEN | 5,200 | 17,000 |

TABLE 7

| Example | Ingredients of liquid composition (parts by weight) | | | | | | | |
|---|---|---|---|---|---|---|---|---|
| | 2EHA | AA | Elastomer | Photoinitiator | Crosslinking agent | Pigment | Filler | Filler type |
| Preparation Example 23 | 96 | 4 | 15 | 0.1 | 0.24 | 1.18 | 5 | MFL-SEVEN |
| Preparation Example 24 | 96 | 4 | 15 | 0.1 | 0.36 | 1.18 | 5 | MFL-SEVEN |
| Preparation Example 25 | 96 | 4 | 15 | 0.1 | 0.48 | 1.18 | 5 | MFL-SEVEN |
| Preparation Example 26 | 96 | 4 | 15 | 0.1 | 0.6 | 1.18 | 5 | MFL-SEVEN |

Preparation Examples 27 AND 28: Preparation of Liquid Composition

Liquid compositions were prepared in the same manner as in Preparation Example 8, except that a mixture of 2EHA, AA, and 2HEA in amounts listed in the following Table 8 was used as acrylic monomers, and organic microspheres (MFL-SEVEN) at 5 parts by weight with respect to 100 parts by weight of the acrylic monomers were included as a filler in each respective liquid composition.

TABLE 8

| Example | Ingredients of liquid composition (parts by weight) | | | | | | | | |
|---|---|---|---|---|---|---|---|---|---|
| | 2EHA | AA | 2HEA | Elastomer | Photoinitiator | Crosslinking agent | Pigment | Filler | Filler type |
| Preparation Example 27 | 92 | 4 | 4 | 15 | 0.1 | 0.12 | 1.18 | 5 | MFL-SEVEN |
| Preparation Example 28 | 88 | 4 | 8 | 15 | 0.1 | 0.12 | 1.18 | 5 | MFL-SEVEN |

Preparation Examples 29 to 31

Preparation of Liquid Composition

Liquid compositions were prepared in the same manner as in Preparation Example 8, except that organic microspheres (MFL-SEVEN) in an amount listed in the following Table 9 were included as a filler in each respective liquid composition.

TABLE 9

| Example | Ingredients of liquid composition (parts by weight) | | | | | | | |
|---|---|---|---|---|---|---|---|---|
| | 2EHA | AA | Elastomer | Photoinitiator | Crosslinking agent | Pigment | Filler | Filler type |
| Preparation Example 29 | 92 | 8 | 15 | 0.1 | 0.12 | 1.18 | 1.5 | MFL-SEVEN |
| Preparation Example 30 | 92 | 8 | 15 | 0.1 | 0.12 | 1.18 | 0.75 | MFL-SEVEN |
| Preparation Example 31 | 92 | 8 | 15 | 0.1 | 0.12 | 1.18 | 0.2 | MFL-SEVEN |

Examples 1 to 21: Preparation of Double-Sided Adhesive Tape

Each of the liquid composition prepared according to Preparation Examples 8 to 29 was coated between two polyethylene terephthalate support films release-treated with fluorosilicone by using dual rollers at a coating speed of 1.5 m/min, and was subjected to four-step UV curing as follows while the liquid composition and support films were passed through an inside of an inert chamber: (1) UV 1 mW/cm$^2$, 60 seconds; (2) UV 1 mW/cm$^2$, 60 seconds; (3) UV 10 mW/cm$^2$, 60 seconds; and (4) UV 10 mW/cm$^2$, 60 seconds. Subsequently, the support films were removed to prepare a 140 μm-thick acrylic rubber foam sheet.

Then, one surface of the acrylic rubber foam sheet thus obtained was heat-laminated with a 25 μm-thick substrate film layer at a temperature of 50° C. to prepare a laminated sheet with a width of 200 mm and a thickness of 165 μm.

A 60 μm-thick surface adhesive layer was heat-laminated onto each of both sides of the laminated sheet at a temperature of 50° C. to prepare a double-sided adhesive tape having a total thickness of 285 μm and including the acrylic rubber foam sheet as a core layer.

Comparative Examples 1 to 7: Preparation of Double-Sided Adhesive Tape

Double-sided adhesive tapes with a total thickness of 285 μm were prepared in the same manner as in Example 1, except that liquid compositions prepared according to Preparation Examples 2 to 6, 30, and 31 were used.

Test Example 2: Evaluation of Double-Sided Adhesive Tape

Each of the double-sided adhesive tapes prepared according to above examples and comparative examples was evaluated as follows, results of which are shown in Tables 11 and 12. Also, for comparison with a conventional product, the performance of a conventional product (930WAX from NDFOS Co., Ltd.) was also tested in the same manner, results of which are shown in the following Table 10.

(1) Impact Resistance—Free-Fall Tensile Test

Figure 5:
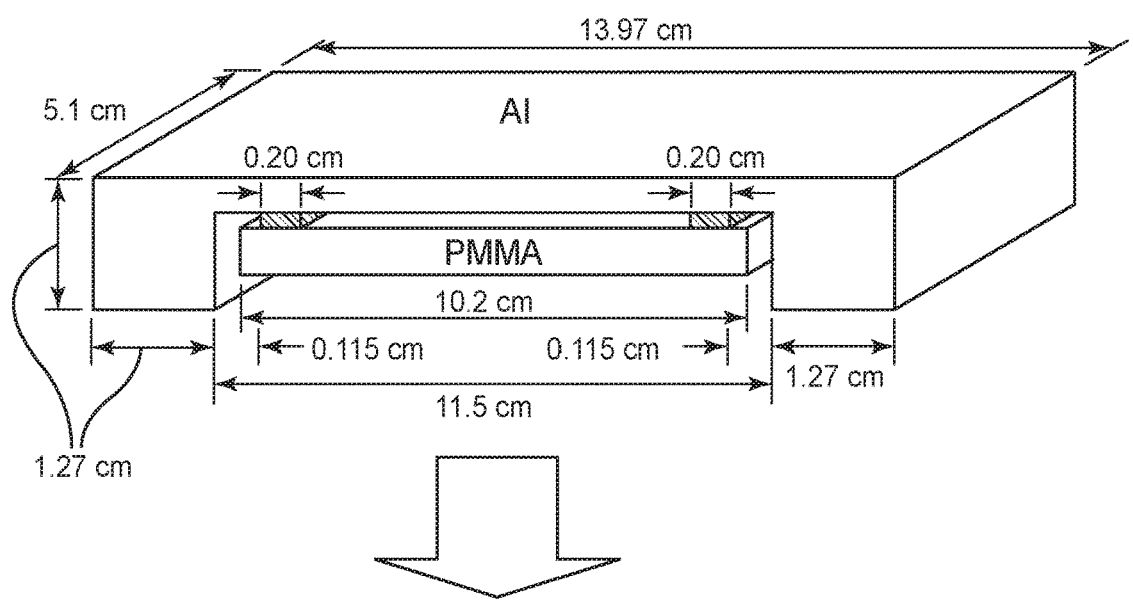
FIG. 5 illustrates a configuration of a test device for measuring a free-fall tensile test according to Test Example 2.

The impact resistance of each double-sided adhesive tape was evaluated according to a free-fall tensile test. Specifically, the double-sided adhesive tape was cut into a size of 0.2 cm×5.1 cm (width×length), two such pieces of the double-sided tape thus prepared were used for attaching 17.6 g of a hard-coated poly(methyl methacrylate) (PMMA) sheet to a specially constructed, 147 g aluminum (Al) frame to prepare a test sample as shown in FIG. 5. Test samples were stored for three days under a room-temperature (RT) condition or a high temperature, high humidity (60° C./90% RH) condition. Subsequently, each test sample was dropped on a stainless steel (SUS) plate ten times at a height of 1 m. When the adhesion did not fail even after the ten trials of drop impact, the corresponding sample was dropped ten more times at a height of 1.5 m. When the adhesion did not fail, the sample was dropped 20 more times at a height of 2.0 m. The number of trials until the sample broke was recorded and used for evaluating impact resistance.

(2) Adhesive Strength—Push-Out Strength

A push-out strength of the double-sided adhesive tapes was determined to compare the adhesive strength of the tapes. Specifically, a polycarbonate (PC) or magnesium (Mg) sheet having a hole in a center thereof was prepared as a first sheet, and an ink-coated glass sheet was prepared as a second sheet. Each double-sided adhesive tape was cut into a rectangular rim with a rim width of 3 mm in such a way that the rectangular rim had outer dimensions of 15.5 mm×15.5 mm (width×length). The piece of the double-sided adhesive tape thus prepared was used for attaching the second sheet to the first sheet in such a way that centers thereof were aligned, and the attached sheets were stored for three days. Then, through the hole on the first sheet, the second sheet was pushed away from the first sheet using a universal testing machine (UTM) at a constant strain rate of 20 mm/min, and the maximum force at which the attached sheets were separated from each other was recorded as the push-out strength.

TABLE 10

| Example | Free-fall tensile test (number of trials) | | Push-out strength (kgf) |
| --- | --- | --- | --- |
| | RT | 60, 90% RH | |
| 930WAX | 10 | 19 | 8.05 |

TABLE 11

| Example | Surface adhesive layer | Acrylic rubber foam composition | Free-fall tensile test (number of trials) | | Push-out strength (kgf) |
| --- | --- | --- | --- | --- | --- |
| | | | RT | 60, 90% RH | |
| Comparative Example 1 | DM | Preparation Example 2 | 10 | 13 | — |
| Comparative Example 2 | DM | Preparation Example 3 | 9 | 19 | — |
| Comparative Example 3 | DM | Preparation Example 4 | 12 | 17 | — |
| Comparative Example 4 | DM | Preparation Example 5 | 5 | 34 | — |
| Comparative Example 5 | DM | Preparation Example 7 | 3 | 22 | — |
| Example 1 | DM | Preparation Example 8 | 12 | 40 | — |
| Example 2 | DM | Preparation Example 9 | 15 | 26 | — |
| Example 3 | DM | Preparation Example 10 | 19 | 18 | 8.65 |
| Example 4 | DM | Preparation Example 12 | 22 | 26 | 8.38 |
| Example 5 | DM | Preparation Example 13 | 24 | 39 | 5.54 |
| Example 6 | DM | Preparation Example 14 | 19 | 38 | 5.37 |
| Example 7 | DM | Preparation Example 15 | 25 | 22 | 5.35 |
| Example 8 | DM | Preparation Example 16 | 21 | 31 | 5.45 |
| Example 9 | DM | Preparation Example 17 | 24 | 26 | 5.38 |

TABLE 12

| Example | Surface adhesive layer | Acrylic rubber foam composition | Free-fall tensile test - RT (number of trials) | Push-out strength (kgf) |
| --- | --- | --- | --- | --- |
| Example 10 | F1 | Preparation Example 18 | 14 | 14 |
| Example 11 | F1 | Preparation Example 19 | 14 | 11.2 |
| Example 12 | F1 | Preparation Example 20 | 16 | 10.6 |
| Example 13 | F1 | Preparation Example 21 | 15 | 11.4 |
| Example 14 | F1 | Preparation Example 22 | 27 | 11.6 |
| Example 15 | F1 | Preparation Example 23 | 21 | 9 |
| Example 16 | F1 | Preparation Example 24 | 20 | 9.2 |
| Example 17 | F1 | Preparation Example 25 | 20 | 9.8 |
| Example 18 | F1 | Preparation Example 26 | 20 | 10 |
| Example 19 | F1 | Preparation Example 27 | 22 | 10.7 |
| Example 20 | F1 | Preparation Example 28 | 26 | 11.7 |
| Example 21 | F1 | Preparation Example 29 | 14 | 10.5 |
| Comparative Example 6 | F1 | Preparation Example 30 | 6 | 10.6 |
| Comparative Example 7 | F1 | Preparation Example 31 | 4 | 9.4 |

As can be seen from the above test results, when proper amounts of both an acrylic elastomer and a filler were included according to the present invention (Examples 1 to 21), impact resistance and adhesiveness that are remarkably superior to those of a conventional product (930WAX) were attained.

Figure 4:
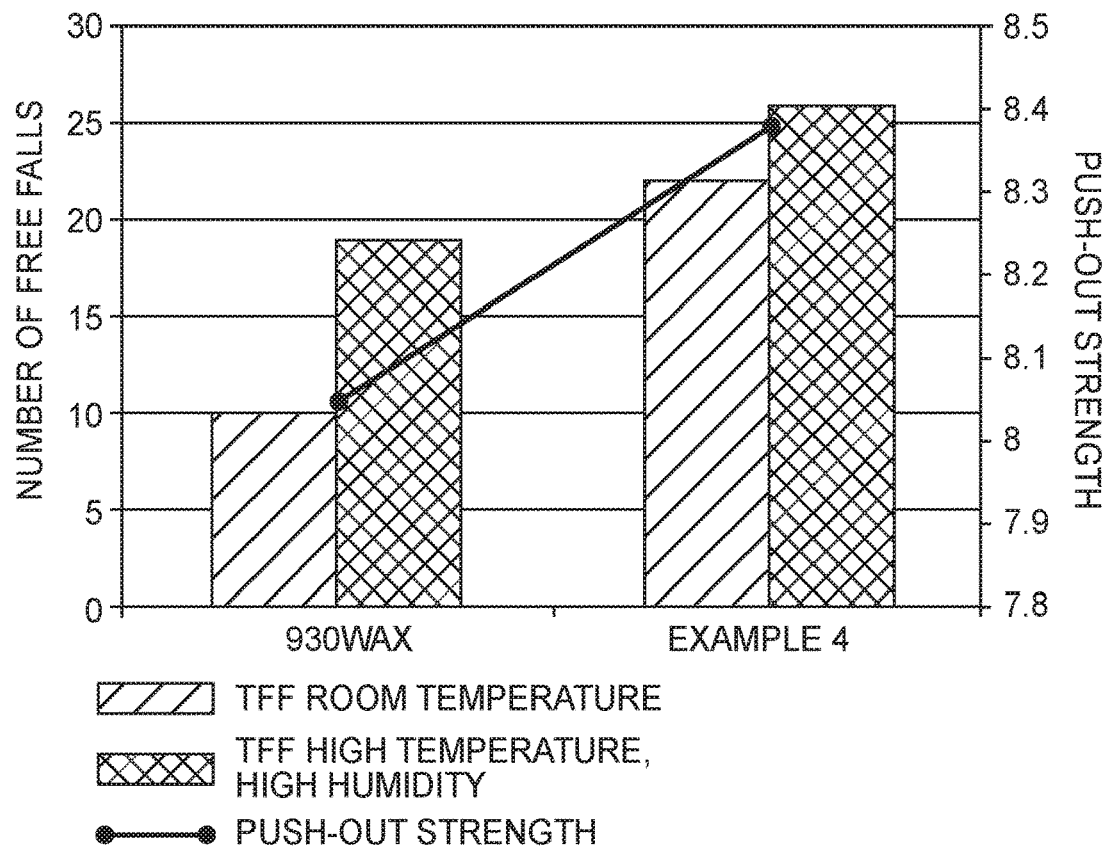
FIG. 4 is a graph that compares a double-sided adhesive tape according to Example 4 and a conventional double-sided adhesive tape in terms of free-fall tensile test and push-out strength measurements.

In particular, referring to FIG. 4, which is a graph that compares a double-sided adhesive tape according to the present invention (Example 4) and a conventional product, it can be seen that the double-sided adhesive tape according to the present invention has excellent free-fall tensile test results under both a room-temperature (RT) condition and a high temperature, high humidity condition and a significantly higher push-out strength as compared to the conventional product.

In contrast, the room-temperature impact resistance of double-sided adhesive tapes according to the present invention without the use of an acrylic elastomer (Comparative Examples 1 to 4) or a filler for forming micropores (Comparative Example 5) or with the use of a trace amount of filler (Comparative Examples 6 and 7) was similar or rather poor as compared to the conventional product (930WAX).

LIST OF REFERENCE NUMERALS

10: double-sided adhesive tape
100: rubber foam layer
200: surface adhesive layer
300: substrate film layer

What is claimed is:

1. Acrylic rubber foam comprising:
   (a) an acrylic resin at 100 parts by weight;
   (b) an acrylic elastomer at 1 to 50 parts by weight; and
   (c) a filler for forming micropores at 1 to 15 parts by weight;
   wherein the acrylic elastomer includes:
      (b1) one or more repeat units represented by Structural Formula 1; and
      (b2) one or more repeat units represented by Structural Formula 2;
      wherein b1 and b2 are included in a weight ratio of 85~99:1~15:

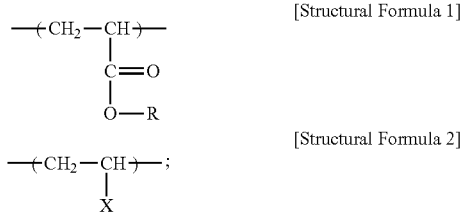

and
   further wherein the acrylic elastomer includes:
   a repeat unit A represented by Structural Formula 1 where R is an ethyl group;
   a repeat unit B represented by Structural Formula 1 where R is a butyl group;
   a repeat unit C represented by Structural Formula 1 where R is a methoxyethyl group; and
   a repeat unit D represented by Structural Formula 2 where X is a carboxyl group.

2. The acrylic rubber foam according to claim 1, wherein the acrylic elastomer includes the repeat unit A, the repeat unit B, and the repeat unit C at a molar ratio of 35~55:45~65:1~5, and the repeat unit D at 2 to 5 wt % based on the total weight of the acrylic elastomer.

3. Acrylic rubber foam comprising:
   (a) an acrylic resin;
   (b) an acrylic elastomer; and
   (c) a filler for forming micropores at 1 to 15 parts by weight;
   wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof; and
   wherein the acrylic rubber foam contains the acrylic elastomer at 7.5 to 15 parts by weight with respect to 100 parts by weight of the acrylic resin.

4. The acrylic rubber foam according to claim 3, wherein the acrylic elastomer includes carbon-carbon double bonds (C=C) at less than 0.1 mol %.

5. The acrylic rubber foam according to claim 3, wherein the acrylic resin includes:
   (a-1) a repeat unit derived from 2-ethylhexyl acrylate at 80 to 99 wt %; and
   (a-2) a repeat unit derived from acrylic acid at 1 to 20 wt %,
   wherein wt % is based on a total weight of the acrylic resin.

6. Acrylic rubber foam comprising:
   (a) an acrylic resin at 100 parts by weight;
   (b) an acrylic elastomer at 1 to 50 parts by weight; and
   (c) a filler for forming micropores at 1 to 15 parts by weight;
   wherein the acrylic resin includes:
      (a-1) a repeat unit derived from 2-ethylhexyl acrylate at 75 to 98 wt %;
      (a-2) a repeat unit derived from acrylic acid at 1 to 10 wt %; and
      (a-3) a repeat unit derived from 2-hydroxyethyl acrylate at 1 to 20 wt %;
      wherein wt % is based on a total weight of the acrylic resin; and
   wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

7. The acrylic rubber foam according to claim 3, wherein the acrylic rubber foam contains the filler at 1 to 7 parts by weight with respect to 100 parts by weight of the acrylic resin, wherein the filler is a glass bubble or an organic microsphere.

8. The acrylic rubber foam according to claim 2, wherein the acrylic rubber foam contains:
   the acrylic elastomer at 7.5 to 15 parts by weight with respect to 100 parts by weight of the acrylic resin; and
   the filler at 1 to 7 parts by weight with respect to 100 parts by weight of the acrylic resin,
   wherein the filler is an expanded-type organic microsphere, and the acrylic resin includes:
   (a-1) a repeat unit derived from 2-ethylhexyl acrylate at 80 to 99 wt % based on a total weight of the acrylic resin; and
   (a-2) a repeat unit derived from acrylic acid at 1 to 20 wt % based on a total weight of the acrylic resin.

9. A method of preparing acrylic rubber foam, the method comprising:
(1) preparing a mixed liquid by mixing 100 parts by weight of an acrylic monomer(s) and 1 to 50 parts by weight of an acrylic elastomer;
(2) preparing a liquid composition with a viscosity of 1,000 to 30,000 cps by adding, into the mixed liquid, 0.01 to 1 part by weight of a polymerization initiator, 0.01 to 1 part by weight of a crosslinking agent, and 1 to 15 parts by weight of a filler for forming micropores based on 100 parts by weight of the acrylic monomer (s); and
(3) shaping and curing the liquid composition,
wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof.

10. A double-sided adhesive tape comprising:
a rubber foam layer consisting of an acrylic rubber foam comprising:
(a) an acrylic resin at 100 parts by weight;
(b) an acrylic elastomer at 1 to 50 parts by weight; and
(c) a filler for forming micropores at 1 to 15 parts by weight,
wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof; and
two surface adhesive layers disposed on both sides of the rubber foam layer;
wherein the rubber foam layer has a thickness of 50 to 250 μm, and each of the two surface adhesive layers has a thickness of 30 to 150 μm.

11. A double-sided adhesive tape comprising:
a rubber foam layer consisting of an acrylic rubber foam comprising:
(a) an acrylic resin at 100 parts by weight;
(b) an acrylic elastomer at 1 to 50 parts by weight; and
(c) a filler for forming micropores at 1 to 15 parts by weight,
wherein the acrylic elastomer includes one or more acrylic repeat units in a main chain thereof and one or more functional groups selected from the group consisting of an epoxide group, a halogen, a carboxyl group, a hydroxyl group, and an amino group in a main chain or a side chain thereof;
two surface adhesive layers disposed on both sides of the rubber foam layer; and
a substrate film layer interposed between the rubber foam layer and one of the two surface adhesive layers.

12. The double-sided adhesive tape according to claim 11, wherein the substrate film layer contains a polyester resin and has a thickness of 10 to 100 μm.

13. A composite comprising:
a first adherend;
a second adherend; and
the double-sided adhesive tape according to claim 10 bonding the first adherend and the second adherend together by being interposed between the first adherend and the second adherend.

14. The composite according to claim 13, wherein the first adherend is a glass substrate and the second adherend is a plastic substrate or a metal substrate.

* * * * *